Patented June 5, 1945

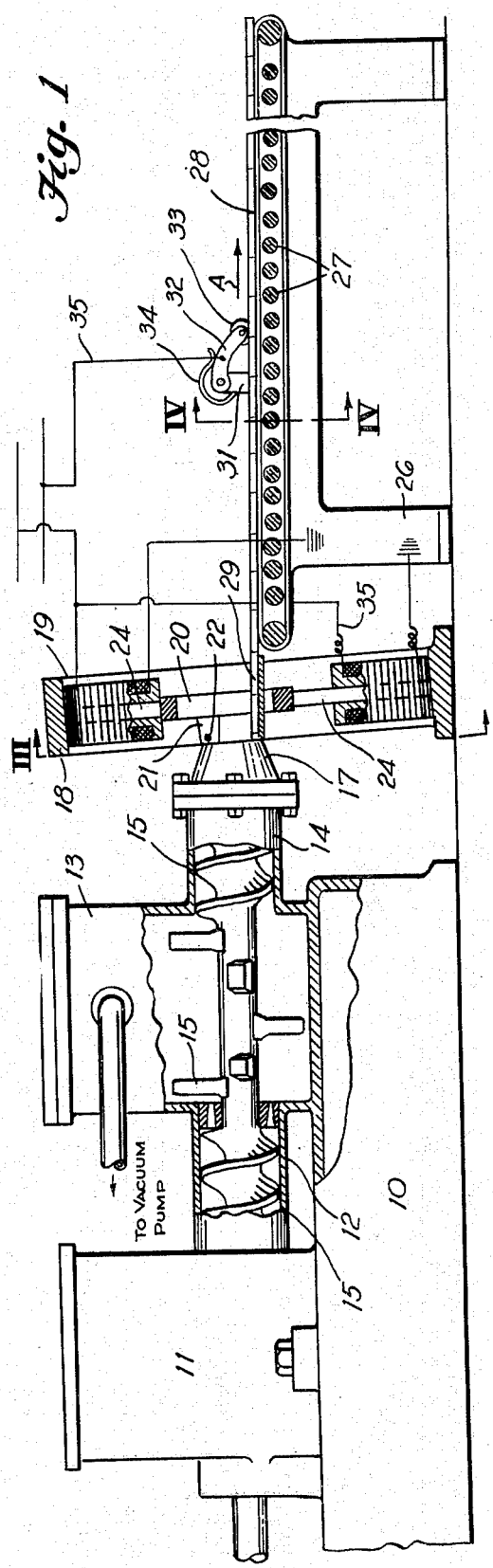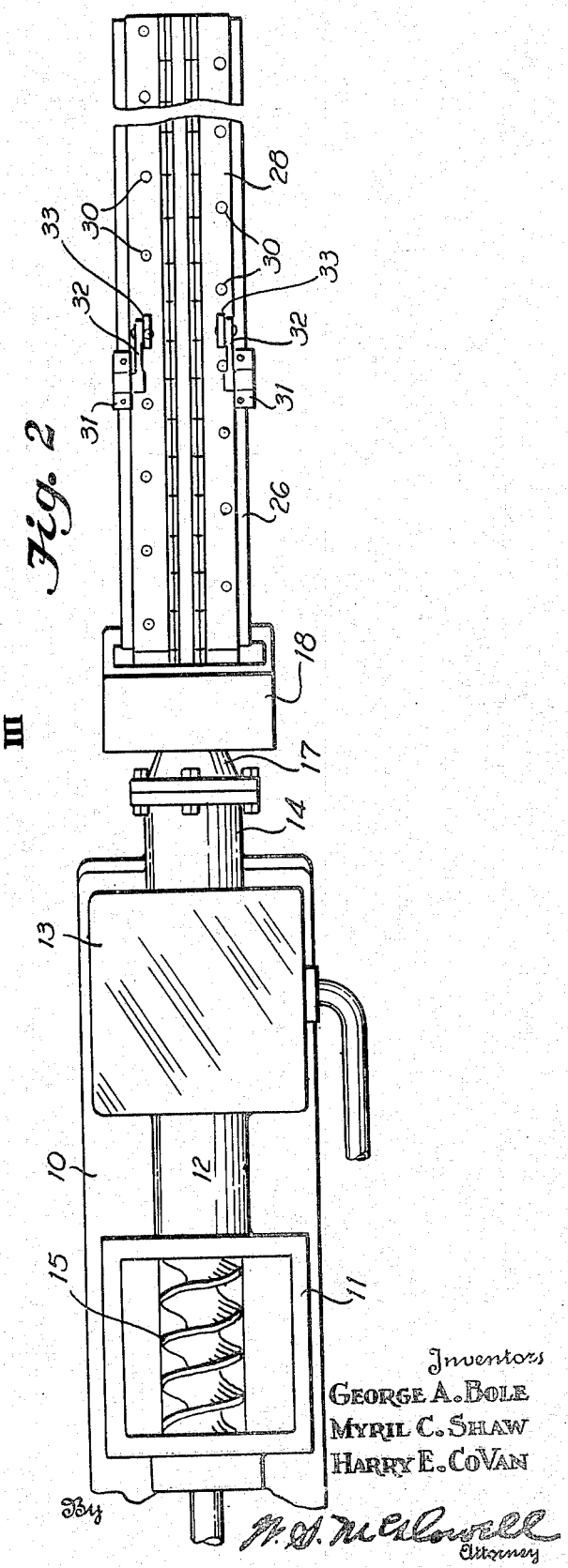

2,377,668

UNITED STATES PATENT OFFICE 2,377,668

EXTRUDING AND CUTTING APPARATUS FOR PLASTIC MATERIALS

George A. Bole, Myril C. Shaw, and Harry E. Co Van, Columbus, Ohio, assignors to The Edward Orton Jr. Ceramic Foundation, Columbus, Ohio, a testamentary trust Application August 18, 1943, Serial No. 499,150

5 Claims. (Cl. 25—105)

This invention relates to clay-extruding and cutting apparatus, having particular reference to improved means for extruding one or more clay columns and simultaneously therewith transversely severing such a column or columns into sections of desired length.

While the apparatus forming the present invention may be used in many different capacities, it is particularly applicable to the formation of moldable clay blanks used in the manufacture of pyrometric cones. Such cones are employed for determining firing temperatures in kilns in which ceramic bodies are subjected to heat treatment. Ordinarily, these cones comprise tri-sided pyramidal bodies of clay composition. The larger or base ends of said cones are embedded in plaques and are placed in the firing zone of a kiln. When the ware attains a desired state of maturity, the same may be noted by the fact that the cones soften and deform, thus apprising the kiln operator of the attained temperature.

It has been a common practice in the manufacture of such cones for operators to take a small quantity of cone-forming material in a plastic state, roll the plastic material by hand into cylindrical form and insert the same in the cone-forming cavity of a mold. Such operations have required considerable time and unless care was utilized, the mold cavities were not filled to the required degree to form cones of uniform weight and dimensions.

In accordance with the present invention, we provide apparatus for producing readily handled plastic blanks, each of which has greater volume than is necessary to completely fill a mold cavity, so that the blanks may be rapidly handled by operators during the manufacture of such cones and when inserted into the cavity of a mold, will produce a surplus of material capable of being readily removed.

It is another object of the invention to provide means for simplifying the operations of molding pyrometric cone bodies, reduce manufacturing costs and to form cones of uniform quality and of high dimensional accuracy.

A further object is to provide a cone blank forming machine in which one or more columns of plastic cone-forming material are extruded on an endless belt, there being disposed between the extruding machine and the material-receiving end of the belt an electrically actuated column cutter, the belt being provided with spaced contacts so that upon movement of the belt and the engagement of the contacts with switch devices, the said cutter will be actuated to sever the column or columns transversely thereof into suitable lengths, thus forming blanks which may be readily manipulated during the operations of inserting the same into the cavities of a mold.

For a further understanding of the invention, reference is to be had to the following description and the accompanying drawings, wherein:

Fig. 1 is a side elevational view, partly in vertical section, of a cone blank forming machine in which the present invention is embodied;

Fig. 2 is a top plan view thereof;

Figure 3:
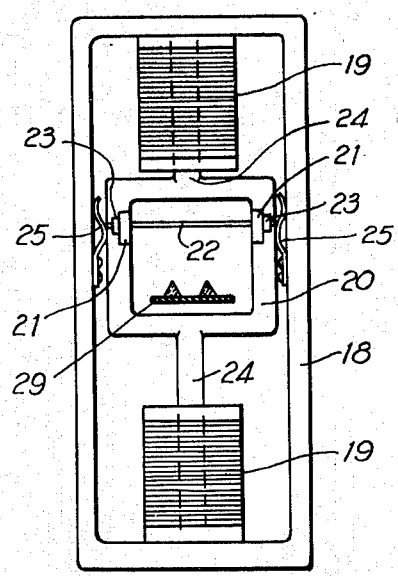
Fig. 3 is a vertical transverse sectional view on the plane indicated by the line III—III of Fig. 1.
Figure 4:
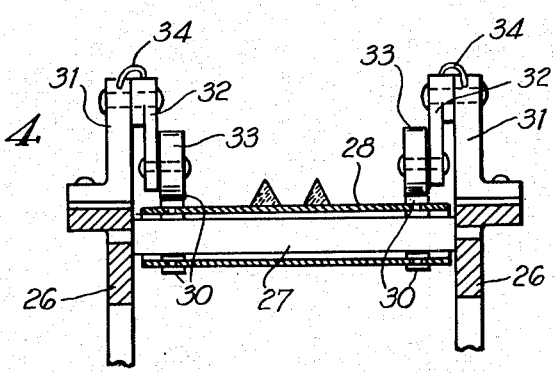
Fig. 4 is an enlarged sectional view on the line IV—IV of Fig. 1.
Figure 5:
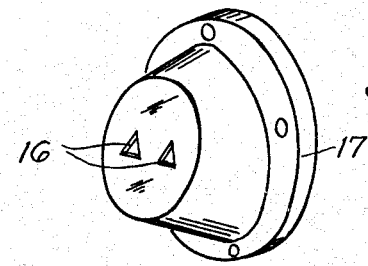
Fig. 5 is a perspective view of the extrusion die.

Referring more particularly to the drawings, the numeral 10 designates the bed of a pugging, de-airing and extrusion mill, which may be of any standard construction. As usual, the mill embodies a pugging section 11, clay granulating or disintegrating section 12, the vacuum controlled de-airing section 13 and an extrusion section 14. These sections are provided with the usual motor driven augers and clay working devices 15, so arranged as to advance plastic clay introduced into the top of the pugging section, in a substantially longitudinal direction through the machine and discharge the same in one or more bars or columns through outlet openings 16 provided in a detachable head or die 17 located at the discharge end of the extrusion section 14. Clay or other columns of plastic composition so produced are characterized by their complete homogeneity and uniform consistency, being free from lumps, either hard or soft, so that pyrometric cones made therefrom will be uniform in their thermal response.

Located at the discharge end of the bar or column extrusion section 14 is a cutter frame 18. This frame has mounted therein a pair of solenoids 19, one of which is arranged above the head 17 and the other below said head. Cooperative with the field windings of the solenoids is a rectangular armature frame 20 through which the columns extruded from the head 17 are adapted to pass. The frame 20 is formed with rearwardly disposed ears 21 with which is connected the ends of a tensioned cutter wire 22. Threaded devices 23 cooperate with the wire 22 to maintain the latter under desired tension. The solenoids are adapted to be alternately and automatically energized thereby raising and lowering the armature frame 20 and causing the cutter wire 22 to pass transversely through the clay bars or columns as the latter are extruded from the head 17. Preferably, the frame 20 is formed with core extensions 24 which enter the solenoid coils and, while the latter are energized, are attracted thereby to impart a sharp back and forth movement to the frame 20. This movement is so rapid that it does not in any way interfere with the continued advance of the extruded material from the mill. If desired, leaf springs 25 may be carried by the sides of the armature frame 20 for engagement with corresponding sides of the frame 18, in order to hold the armature frame in its elevated position when the upper solenoid is deenergized and prior to the energizing of the lower solenoid.

On the other side of the cutter mechanism as regards the extrusion mill, there is provided a conveyor frame 26. At a suitable horizontal level, the frame 26 is provided with a plurality of parallel metallic rolls 27, the latter having reduced ends journaled for rotation in bearings provided therefor at the sides of the frame 26. Passing over these rolls is an endless belt 28, which may be formed from rubber, leather or other electrical non-conductor.

As the clay bars or columns are extruded from the head 17, the same pass through the armature frame 20 by being supported upon a stationary guide plate 29 projecting longitudinally from the bottom of the head 17, so that said clay bars or columns may be delivered by longitudinal advancement upon the upper surface of the belt 28. The belt is advanced in the direction indicated by the arrow A in Fig. 1, conveying the severed cone-forming blanks to positions in which the same may be manually removed from the belt and inserted into the cavities of suitable molds, not shown. In these molds, the blanks are trimmed to exacting dimensions and are then air dried and artificially heated to produce commercial pyrometric cones.

The movement of the belt is employed to control the alternate energizing and deenergizing of the solenoids 19. To this end, the sides of the belt are provided with longitudinally spaced metallic contacts 30, the contacts on one side of the belt being staggered in location with respect to those on the other, so that the contacts on one side of the belt will control the operation of one solenoid and those on the other side of the belt, the second solenoid.

Intermediately of its length, the frame 26 has arranged thereon a pair of registering oppositely disposed brackets 31, which are electrically insulated from the frame 26. Each of these brackets carries a pivot arm 32 having a roller 33 mounted on its outer end. Each of the arms 32 may be urged by a spring 34 to swing in a direction maintaining its roller 33 in positive contact with the upper surface of the belt 28 in tracking registration with the contacts 30. Conductors 35 extend from each of the arms 32 to the field winding of an associated solenoid, while the opposite terminal of the field winding of each solenoid is grounded on the frame 26 in which the rolls 27 are journaled, current from any suitable source being employed to energize the two independent circuits.

It will be evident that as the rollers 33 successively engage the contacts 30, the field coils of the solenoids will be alternately energized and deenergized, thus sharply raising and lowering the armature frame 20 and thereby causing the cutter wire 22 to transversely sever the clay bars or columns as the latter are being extruded from the head 17. The clay bars or columns are thus cut into sections of desired length, producing the cone-forming blanks which are deposited on the upper run of the belt 28, and by the latter conducted to positions where the same may be removed manually from the belt and used in the filling of the mold cavities.

In view of the foregoing, it will be seen that the present invention provides an improved automatically operating cutter mechanism for severing extruded clay bars or columns into sections of desired length. The length of the severed blank may be varied by controlling the spacing of the contacts 30.

While we have described the apparatus as being particularly useful in the manufacture of blanks for the formation of pyrometric cones, it will be understood that this is but a single practical adaptation of the invention and that the operating features of our improved machine may be used in any capacity in which plastic material is extruded in the form of bars, columns, tapes or ribbons.

It is not necessary positively to drive the conveyor belt 28, since movement of the belt is effected by the plastic columns being extruded from the die 17.

We claim:

1. In apparatus of the class described, means for extruding a column of material in a plastic state, said means having a column-discharging head, a frame mounted contiguous to said head, spaced upper and lower solenoids stationarily carried by said frame, an armature frame operative to be raised and lowered by the alternate energizing and deenergizing of said solenoids, a tensioned cutter carried by said armature frame and movable in unison with the latter across the outer face of said head to sever transversely a plastic column extruded from said means, an endless conveyor on which said severed materials are advanced longitudinally, and circuit making and breaking means cooperative with said conveyor for controlling the energizing and deenergizing of said solenoids.

2. In apparatus of the class described, a clay working and extruding machine, said machine having a discharge head from which a clay column in a plastic condition is continuously discharged, a frame mounted contiguous to said head, a vertically movable cutter mounted for reciprocating movement across the face of said head for severing the clay column transversely to produce blanks of suitable length, an endless conveyor on which said blanks are received, and electrically actuated means for reciprocating said cutter, the operation of said cutter means being governed by the movement of said conveyor.

3. Mechanism for cutting extruded plastic columns into blanks, comprising a frame, a pair of spaced opposed solenoid coils stationarily carried by said frame, an armature arranged between said coils for reciprocatory movement as the coils are successively energized and deenergized, a clay column cutter carried by said armature, an endless conveyor adapted to receive the clay blanks severed by said cutter, independent circuits in which said solenoid coils are arranged, and spaced circuit making means carried by said conveyor for closing the circuits of said coils at regulated intervals to cut clay columns extruded from said head transversely in order to form blanks of desired length.

4. Cutting apparatus for extrusion machines comprising a frame arranged contiguous to the discharge end of an extrusion machine, a pair of spaced opposed solenoid coils stationarily carried by said frame, an armature cooperative with said coils and adapted to be actuated thereby as the coils are alternately energized and deenergized, a cutter wire carried by said armature and movable in unison therewith to transversely sever a column of plastic material discharged from an associated extrusion machine, an endless belt on which the lengths of the severed material are received, longitudinally spaced contacts carried by said belt contiguous to the side edges thereof, and movable switch devices cooperative with said contacts and operable upon engagement therewith to energize said solenoid coils.

5. Apparatus for cutting extruded clay columns into blanks of suitable length comprising a clay-working and extruding machine, said machine having an orificed discharge head from which a clay column in a plastic condition is adapted to be continuously discharged, a frame stationarily mounted contiguous to the outer face of said head, stationary upper and lower solenoid coils carried by said frame, an armature common to both coils and adapted to be reciprocated by the alternate energizing and deenergizing of said coils, the intermediate part of said armature being formed with an opening in registration with the outer face of the discharge head of said extruding machine, a stationary support arranged in said opening for the reception of a clay column issuing from said head, a cutting element carried by said armature movable across the outer face of said head to sever the clay column into blank-forming lengths, a longitudinally movable conveyor registering with said support for the reception of the severed blank lengths, longitudinally spaced contacts carried by said conveyor, energizing circuits for said solenoid coils, and switch devices mounted adjacent to said conveyor for engagement with said contacts, whereby to periodically energize and deenergize said circuits.

GEORGE A. BOLE.
MYRIL C. SHAW.
HARRY E. CO VAN.